US005520894A

United States Patent [19]

Heesink et al.

[11] Patent Number: 5,520,894

[45] Date of Patent: May 28, 1996

[54] PROCESS FOR REMOVING CARBON DIOXIDE REGENERATIVELY FROM GAS STREAMS

[75] Inventors: Albertus B. M. Heesink, Deventer; Herman M. G. Temmink, Apeldoorn, both of Netherlands

[73] Assignee: Nederlandse Organisatie Voor Toegepast-Natuurwetenschappelijk Onderzoek Tno, Delft, Netherlands

[21] Appl. No.: 360,767

[22] PCT Filed: Jun. 30, 1993

[86] PCT No.: PCT/NL93/00136

§ 371 Date: Dec. 23, 1994

§ 102(e) Date: Dec. 23, 1994

[87] PCT Pub. No.: WO94/01203

PCT Pub. Date: Jan. 20, 1994

[30] Foreign Application Priority Data

Jul. 2, 1992 [NL] Netherlands .......................... 9201179

[51] Int. Cl.[6] .......................... B01D 53/62; B01D 53/96

[52] U.S. Cl. .................... 423/230; 423/220; 423/437 M; 95/139

[58] Field of Search .............................. 423/230, 437 M, 423/220; 165/104.18; 95/139; 96/123, 130, 146, 150; 422/223, 173, 168

[56] References Cited

U.S. PATENT DOCUMENTS

| | | | |
|---|---|---|---|
| 4,177,158 | 12/1979 | Blue | 252/189 |
| 4,283,204 | 8/1981 | Savage | 55/3 |
| 4,330,430 | 5/1982 | Lancet et al. | 252/420 |
| 4,364,915 | 12/1982 | Proctor | 423/437 |
| 4,431,622 | 2/1984 | Moss | 423/437 |
| 4,578,370 | 3/1986 | Greenwood | 502/37 |
| 4,613,344 | 9/1986 | Henrich et al. | 48/77 |
| 5,229,091 | 7/1993 | Buchanan et al. | 423/244.01 |

FOREIGN PATENT DOCUMENTS

| | | | |
|---|---|---|---|
| 582189 | 8/1959 | Canada | 423/230 |
| 0158232 | 10/1985 | European Pat. Off. . | |
| 61-146344 | 7/1986 | Japan . | |
| 3032721 | 2/1991 | Japan . | |
| 3267120 | 11/1991 | Japan | 423/230 |
| 365111 | 7/1930 | United Kingdom | 423/230 |

*Primary Examiner*—Gary P. Straub
*Assistant Examiner*—Timothy C. Vanoy
*Attorney, Agent, or Firm*—Young & Thompson

[57] ABSTRACT

A process for removing carbon dioxide regeneratively from a hot gas stream, containing flue gases or fuel gases, wherein the gas stream is successively: a) used for heating (1) and/or desorbing (2) a solid absorbent loaded with carbon dioxide; b) optionally used for generating energy (12); c) passed through an absorber (3) in which carbon dioxide from the gas stream is absorbed on the absorbent, and: d) is discharged (11); and wherein: e) the absorbent from step c) is desorbed in ta desorber (2) at least partially and optionally under elevated pressure and is then returned to step c). A system for carrying out the process is also described. The process and the system are suitable for removing carbon dioxide from combustion gases and for shifting (coal) gasification gases toward hydrogen.

10 Claims, 2 Drawing Sheets

1
2
3
4
5
6
7
8
9
10
11
12
13
14

1
2
3
4
5
6
7
8
9
10
11
13
13
15
16

PROCESS FOR REMOVING CARBON DIOXIDE REGENERATIVELY FROM GAS STREAMS

FIELD OF THE INVENTION

The invention relates to a process for removing carbon dioxide from hot gas streams.

BACKGROUND OF THE INVENTION

The production of carbon dioxide in energy generation processes is becoming more and more of a problem worldwide. The increased concentration of carbon dioxide in the atmosphere results in reduced heat radiation from the Earth, which causes the temperature on Earth to rise and a number of life-determining processes to be perturbed. A solution for this problem can be sought in limiting the consumption of energy and, in addition, in forms of energy generation which do not yield carbon dioxide, such as combustion of hydrogen, nuclear energy and solar energy. The effect of solutions of this type is limited, certainly in the short and medium term, so that it is, at most, a question of reduced increase of the production of carbon dioxide.

When fossil fuels are gasified, the main products are hydrogen and carbon monoxide, the most desirable component of the two being hydrogen. The shift from carbon monoxide to hydrogen can be effected, for example, by treatment with water (steam). This again produces carbon dioxide which causes the problems outlined above.

Methods for removing carbon dioxide from gas streams do exist, but they have the drawback that they result in a considerable decrease (approximately 10%) of the efficiency of the energy generation (see K. Blok and C. A. Hendriks, "Voorstellen voor de integrerende studie ter afsluiting van het SOP $CO_2$" [Proposals for the Integrating Study at the close of the Coherent Research Package $CO_2$]. State University of Utrecht, December 1991; Techniques for Absorption or Fixing of $CO_2$, Technieuws Tokyo, volume 29 (1), May 1991, publication of the Dutch Ministry of Economic Affairs.

Japanese Patent Application 51-4090 discloses a process for removing water and $CO_2$ from hot gases, in particular in the manufacture of steel, by treating the gases with CaO and/or MgO. The used oxide can be regenerated, according to this process, by hot air being passed through. In U.S. Pat. No. 3,516,808 a process is described for regenerating calcium oxide which has been used for removing $CO_2$. According to Dutch Patent Application 82.02061 (=GB-A-2,103,645), $CO_2$ and $H_2S$ can be removed in a wet process from gases such as hydrocarbons by treatment with a solution of a tertiary amine and a physical absorbent. Japanese Patent Application 61-146344 discloses a process wherein $CO_2$ and water are removed from inert gases by utilising a zeolite bed which is regenerated by heating with combustion gases of a catalysed combustion of propane.

SUMMARY OF THE INVENTION

A process has now been found by means of which, using any of the current carbon-containing sources of energy such as bituminous coal, petroleum and natural gas, carbon dioxide can be removed, effectively and regeneratively, from the combustion gases or gasification gases, and can be compressed, and in which the decrease in the efficiency can be kept within acceptable limits (less than approximately 5%).

The process according to the invention is characterised in that the gas stream is successively:

a) used for heating and/or desorbing a solid absorbent loaded with carbon dioxide;

b) optionally used for generating energy;

c) passed through an absorber in which carbon dioxide from the gas stream is absorbed on the absorbent, and:

d) is discharged; and wherein:

e) the absorbent from step c) is desorbed in a desorber at least partially and optionally under elevated pressure and is then returned to step c).

According to this process, the gas stream is stripped of carbon dioxide by the absorbent at a temperature at which the absorption heat liberated can be used in the energy-producing process. The loaded absorbent is then regenerated, with the aid of heat present in the energy-producing process, at an elevated temperature, possibly also at an elevated pressure, carbon dioxide dissociating off. The carbon dioxide liberated during the desorption can, if necessary, be compressed further, before it is utilised or discharged. In this process the energy generated in the energy-producing process is thus utilised for the separation, and optionally the compression, of the carbon dioxide. The efficiency of the energy-producing process does not, however, drop as a result, as the heat liberated in the absorption can be utilised if a suitable absorbent is chosen. It is true that there may be drops in the efficiency as a result of pressure differentials across the absorber and as a result of heat losses from the apparatus used, but these remain within acceptable limits (less than 5%).

The most important advantage achieved by means of the process according to the invention is the reduced energy loss compared to processes employing wet scrubbing. The absorption step takes place at so high a temperature that the liberated heat can still be used for generating energy.

In the process according to the invention, the absorbent used is preferably calcium oxide and/or magnesium oxide, optionally in the presence of calcium carbonate. More preferably, magnesium oxide is used, especially half-calcined dolomite ($CaCO_3.MgO$).

The heat exchange in step a) preferably takes place at a temperature of 500°–900° C., especially 600°–800° C. The absorption in step c) preferably takes place at a temperature of 150°–500° C., especially 200°–350° C. The desorption in step e) preferably proceeds at a temperature of 300°–850° C., especially at 400°–700° C.

For the purpose of the absorption and/or the desorption, one or more fluidised beds connected in parallel can be used. The heat liberated during the absorption is preferably used for generating energy.

The process according to the invention can be used both for removing carbon dioxide from flue gases and for removing carbon dioxide from fuel gases. In the first instance this involves the treatment of gas streams which are produced in the combustion of fossil fuels (petroleum, natural gas, bituminous coal, lignite and the like). In the second instance this involves the treatment of gas streams arising in the production of gases intended for combustion, for example in the gasification of powdered coal. The mixture of carbon monoxide and hydrogen formed in the gasification of coal can be shifted, by adding steam, to a mixture containing carbon dioxide instead of carbon monoxide, according to the following reaction equation:

$$CO+H_2O \rightarrow CO_2+H_2$$

By removing the carbon dioxide or a large part thereof, a fuel gas mainly consisting of hydrogen is obtained which upon use (combustion) produces only harmless water. The shift from carbon monoxide to carbon dioxide can advantageously take place in the absorber and can be catalysed by the absorbent itself (such as CaO or MgO) or by a catalyst added to the absorbent, for example a transition metal such as iron, chromium, copper or zinc, for example on alumina as a support.

In the process according to the invention, it is possible to add, before or after the removal of carbon dioxide, a provision known per se for removing other noxious components in the gas streams, such as sulphur dioxide. Sulphur dioxide can also be removed simultaneously by adding a second absorbent, for example calcium oxide.

The invention also relates to a system in which the process for removing carbon dioxide from gas streams can be carried out. The system comprises a heat exchanger (1) which is provided with a gas supply (4) and gas discharge (5) and a solids supply (6) and solids discharge (7), a desorber (2) which is provided with a discharge (10), a solids supply (7) and solids discharge (6) communicating with the heat exchanger (1) and a solids supply (8) and solids discharge (9), and an absorber (3) which is provided with a gas supply (5) communicating with the heat exchanger and a gas discharge (11) and a solids supply (9) and solids discharger (8) communicating with the desorber. The heat exchanger (1) and the desorber (2) may be integrated in the form of, for example, a tube bundle in the desorber, in which case the solids lines (6) and (7) are omitted. If very hot gases, such as combustion gases, are being treated, a boiler section (12) may be connected between the heat exchanger (1) and the gas discharge (5).

BRIEF DESCRIPTION OF THE DRAWINGS

The process and the system according to the invention are explained in more detail with reference to the accompanying FIGS. 1 and 2, wherein.

DETAILED DESCRIPTION OF THE INVENTION

Figure 1:
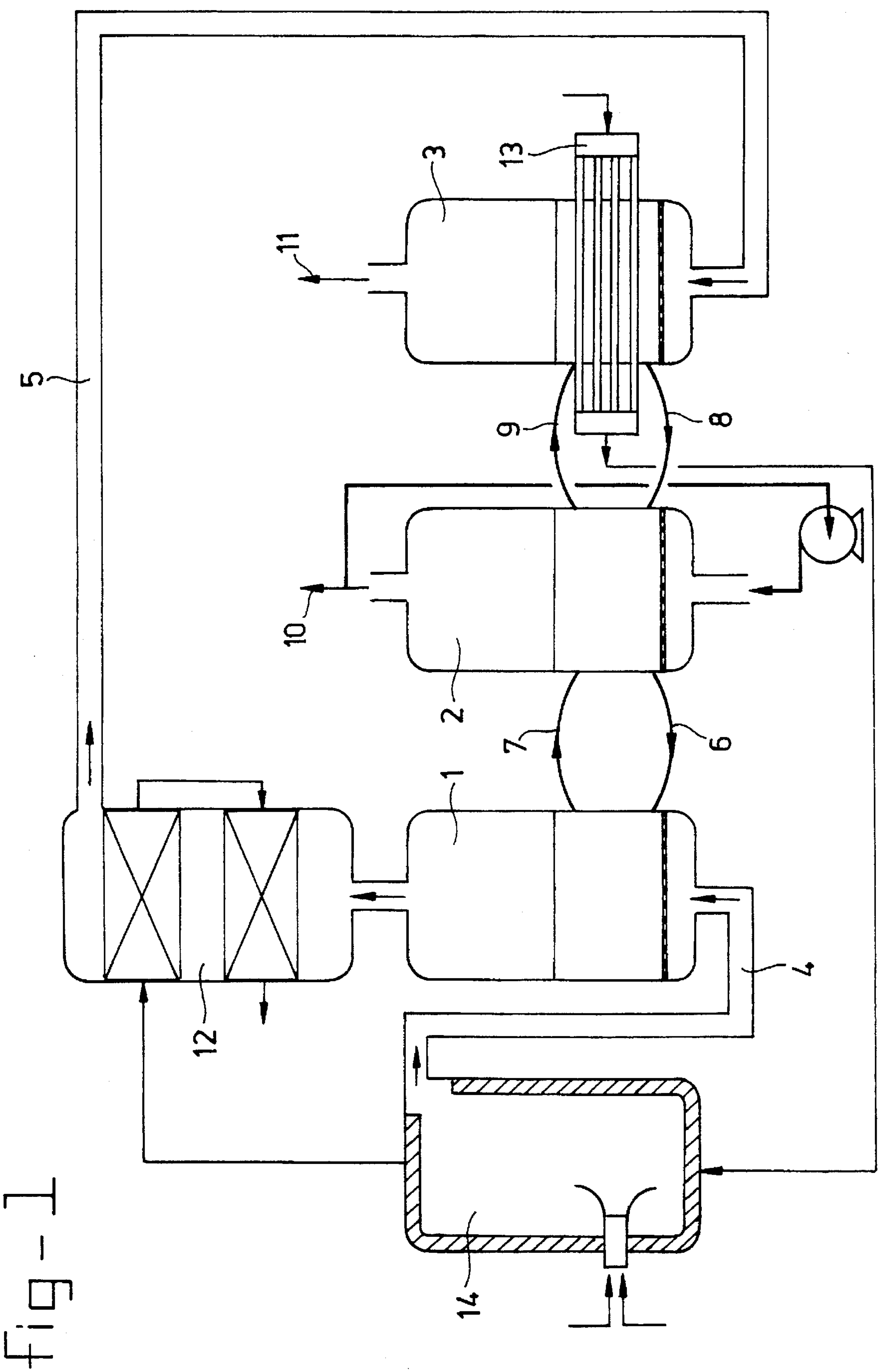
FIG. 1 depicts diagrammatically a system according to the invention which is suitable for removing carbon dioxide from flue gases, and FIG. 2 diagrammatically depicts a system according to the invention which is suitable for removing carbon dioxide from fuel gases.

The flue gases (pressure approximately 1 bar, T=approximately 1000° C.) emanating from the furnace (14) are passed through line (4) to a heat exchanger (1), in which the gases are cooled to a temperature of approximately 700° C. and absorbent is heated for the purpose of desorption. The gases may be cooled, either directly by means of one or more fluidized beds connected in parallel (only one bed is shown (1)), the solids being supplied from and discharged to the desorber (2) through lines (6) and (7) respectively, or by means of a tube bundle in the desorber (2), in which case the heat exchanger (1) and the desorber (2) are integrated. The flue gases then pass through the (conventional) boiler section (12), in which cooling of the gas to approximately 350° C. takes place and in which steam can be generated. The flue gases are then passed via (5) into the absorber (3) (comprising one or more beds connected in parallel), in which the carbon dioxide is largely absorbed from the flue gases at a temperature of 200°–350° C. (depending on the absorbent). The flue gases are now discharged via line (11). The absorption heat liberated is rejected by means of a tube bundle (13) to water which is heated in the process and may turn into steam. The absorbent loaded in the absorber (3) is passed via (8) to the desorber (2) (comprising one or more beds connected in parallel), in which it is heated. $CO_2$ is liberated in the process and is discharged via (10). The unloaded absorbent is returned via (9) to the absorber (3). It is possible to work under pressure in the desorber so that less work has to be performed for the compression of the carbon dioxide liberated. If magnesium oxide or half-calcined dolomite is used as the absorbent, a pressure of approximately 60 bar can be achieved at a desorption temperature of approximately 650° C. The absorption heat liberated or desorption heat supplied, respectively, is approximately 60 kJ/mol when magnesium oxide or half-calcined dolomite are used as the absorbent. This means that for a 1,000 MWel power station the heat flow involved in absorption and desorption is approximately 350 MW.

Figure 2:
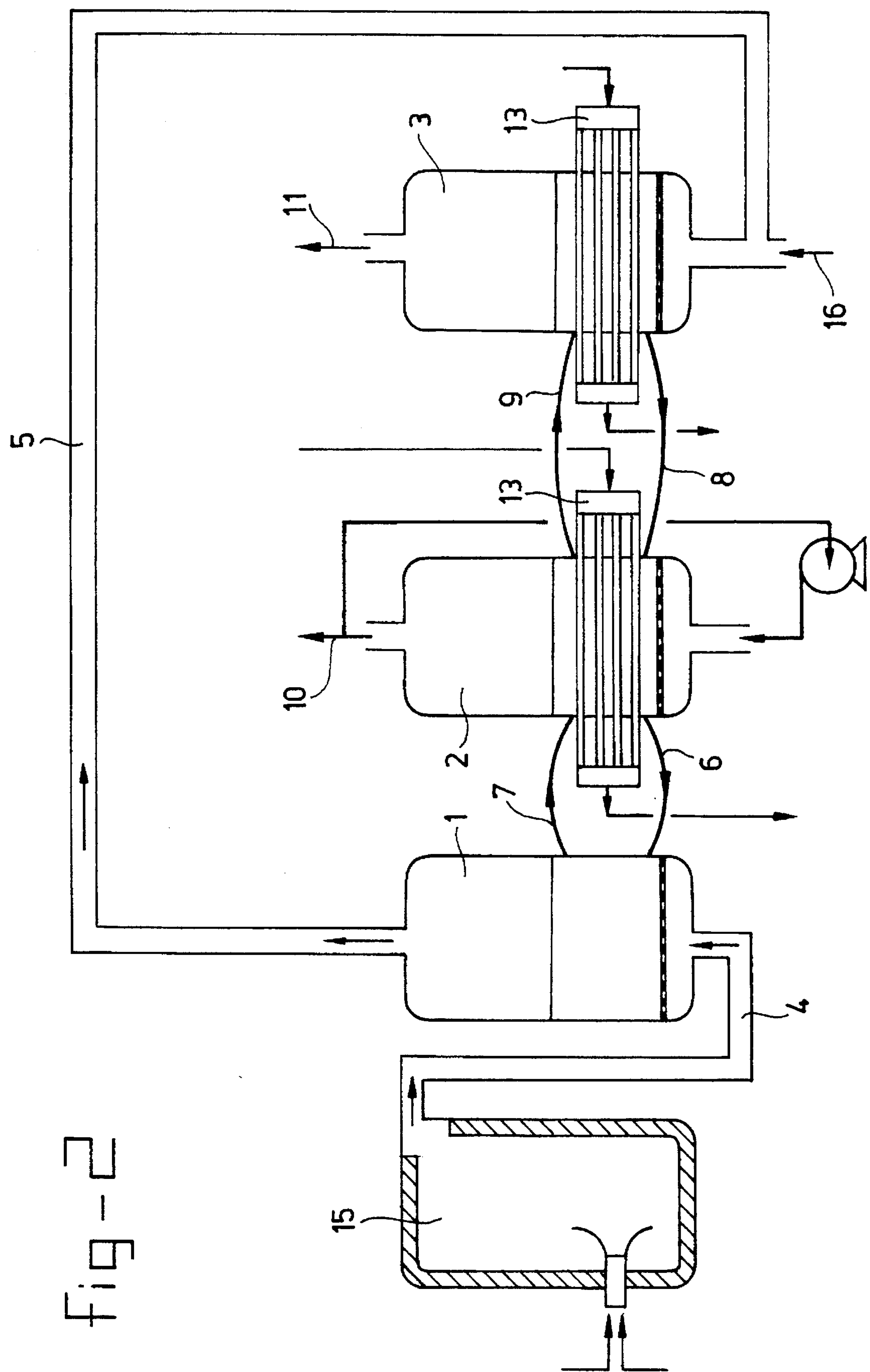

FIG. 2 diagrammatically depicts a system according to the invention which is suitable for removing carbon dioxide from fuel gases. The fuel gas (pressure about 20–40 bar. T=about 1,000° C.) emanating from the gasifier (15) is passed through heat exchanger (1) in which the gases are cooled, to a temperature of approximately 700° C. and absorbent is heated for the purpose of desorption. The gases may be cooled, either directly by means of one or more fluidized beds connected in parallel (only one bed is shown (1)), the solids being supplied from and discharged to the desorber (2) through lines (6) and (7) respectively, or by means of a tube bundle in the desorber (2), in which case the heat exchanger (1) and the desorber (2) are integrated. The fuel gas is then conducted through line (5), mixed with steam via supply (16) and passed into the absorber (3) (comprising one or more beds connected in parallel). The absorber here at the same time serves as a reactor for shifting the gas mixture to carbon dioxide/hydrogen. To this end, the bed optionally comprises a catalyst for said shift reaction. At a temperature of 300°–350° C. (depending on the absorbent) carbon monoxide is converted into carbon dioxide, and the carbon dioxide formed is largely absorbed from the fuel gas. The reaction heat liberated and the absorption heat is rejected by means of a tube bundle (13) to water which is heated in the process and may turn into steam. The fuel gas stripped of carbon dioxide may be passed via (11) to a gas turbine where it is burned with the formation of flue gas consisting of water vapour. The flue gas (T=approximately 600° C.) may be passed through a tube bundle through the desorber (2) where the loaded absorbent is regenerated at a lower temperature. In the process, $CO_2$ is liberated which is discharged via (10). It is possible to work under pressure in the desorber so that less work has to be performed for the compression of the liberated carbon dioxide. The liberated absorption heat or supplied desorption heat, respectively, is approximately 60 kJ/mol when magnesium oxide or half-calcined dolomite are used as the absorbent. This means that for a 600 MWel power station the heat flow involved in absorption and desorption is approximately 200 MW.

We claim:

1. Process for removing carbon dioxide from a hot gas stream selected from the group consisting of fuel gas and flue gas, which comprises the following sequential steps of:

a) passing the gas stream through an absorbent-containing absorber wherein carbon dioxide from the gas stream is absorbed on the absorbent which is selected from the group consisting of CaO, MgO, $CaCO_3 \cdot MgO$ and mixtures thereof, the absorption being carried out at such a temperature that the heat resulting from the absorption is captured in a heat exchanger and can be used for generating energy, b) discharging the gas stream from the absorber, c) desorbing at least partially the $CO_2$ from the absorbent from step a) in a desorber by transferring at least a portion of the $CO_2$-loaded absorbent from the desorber into a heat exchanger where the heat from the hot gas stream liberates at least a portion of the $CO_2$ from the $CO_2$-loaded absorbent thereby regenerating the absorbent and returning the regenerated absorbent back into said desorber d) returning the absorbent to the absorber of step a).

2. Process according to claim 1, wherein the absorbent used is $CaCO_3 \cdot MgO$.

3. Process according to claim 1, wherein the absorption in step a) takes place at a temperature of 150°–500° C.

4. Process according to claim 1, wherein the desorption in step c) takes place at a temperature of 300°–850° C.

5. Process according to claim 1, wherein the absorption is carried out in at least two fluidized beds connected in parallel.

6. Process according to claim 1, wherein the desorption is carried out in at least two fluidized beds connected in parallel.

7. Process according to claim 1, wherein the gas stream comprises carbon monoxide which, prior to step a), is converted at least partially into carbon dioxide.

8. Process according to claim 7, wherein conversion of carbon monoxide takes place in the absorber.

9. Process according to claim 8, wherein a catalyst added to the absorbent catalyses the conversion.

10. Process according to claim 1, wherein the desorption of step c is carried out at elevated pressure.

* * * * *